United States Patent Office.

JOHN HEROLD, OF OMAHA, NEBRASKA.

Letters Patent No. 101,461, dated April 5, 1870.

IMPROVED WATER-PROOF COMPOSITION FOR HARNESS, LEATHER, &c.

The Schedule referred to in these Letters Patent and making part of the same

*To all whom it may concern:*

Be it known that I, JOHN HEROLD, of Omaha, in the county of Douglas and State of Nebraska, have invented a new and useful Improvement in Water-proof Composition for Harness, Leather, and other purposes; and I do hereby declare that the following is a full, clear, and exact description thereof, which will enable others skilled in the art to make and use the same.

This invention relates to a new and useful improvement in a composition for leather and for all the purposes for which it is adapted, and consists in the compound hereinafter described.

In carrying out my invention I make use of the following ingredients in the proportions and in the manner following, to wit:

Neats-foot oil, one (1) pint; beeswax, one (1) ounce; resin, one (1) ounce; mutton tallow, one quarter ($\frac{1}{4}$) of a lb.; gum-tragicanth, one (1) dram; hard soap, five (5) drams; lamp-black, one quarter ($\frac{1}{4}$) of a pound; raw rubber (dissolved in oil;) four (4) ounces, to wit:

The one dram gum-tragicanth is dissolved in one ounce and two drams water. The hard soap is dissolved in one ounce and two drams water. The raw India rubber is dissolved in neats-foot oil in the proportion of four ounces rubber to three gallons neats-foot oil.

The above quantities, when used in the following proportions, make three gallons of the composition, viz:

One ounce tragicanth dissolved in one ounce and two drams water; six ounces of soap, dissolved in one ounce and two drams water; four ounces raw India rubber, dissolved in three gallons neats-foot oil over a vapor bath; six pounds mutton tallow; one and a half pound beeswax; one and a half pound resin; six ounces lamp-black.

Directions for Manufacturing.

Mix the dissolved gum-tragicanth and dissolved soap together, then add the India rubber oil; warm; dissolve the mutton tallow, beeswax and resin over a fire; add the lamp-black and mix together.

I claim for the above composition—

Neats-foot oil and mutton tallow, with the addition of resin used on leather, fill the pores of leather rendering it soft and pliable, and oil the leather.

Soap, gum-tragicanth and rubber-oil (made as described, with neats-foot oil) when used with neats-foot oil, mutton tallow and beeswax, covers the oil, leaves a smooth, glossy surface, and makes the leather oiled, water-proof. The lamp-black gives the color. The whole combining renders the leather impervious to water, and dust will not adhere to the leather upon which it is used.

When manufactured according to the directions, I pack it for convenient use and sale in wooden or tin boxes, tin cans, or glass bottles.

Having thus described my invention,

I claim as new and desire to secure by Letters Patent—

The water-proof composition herein described, substantially as and for the purposes set forth.

The above specification of my invention signed by me this 18th day of January, 1870.

JOHN HEROLD.

Witnesses:
MICHEL ROBLING,
JOHN HOERMAN.